Patented Sept. 13, 1927.

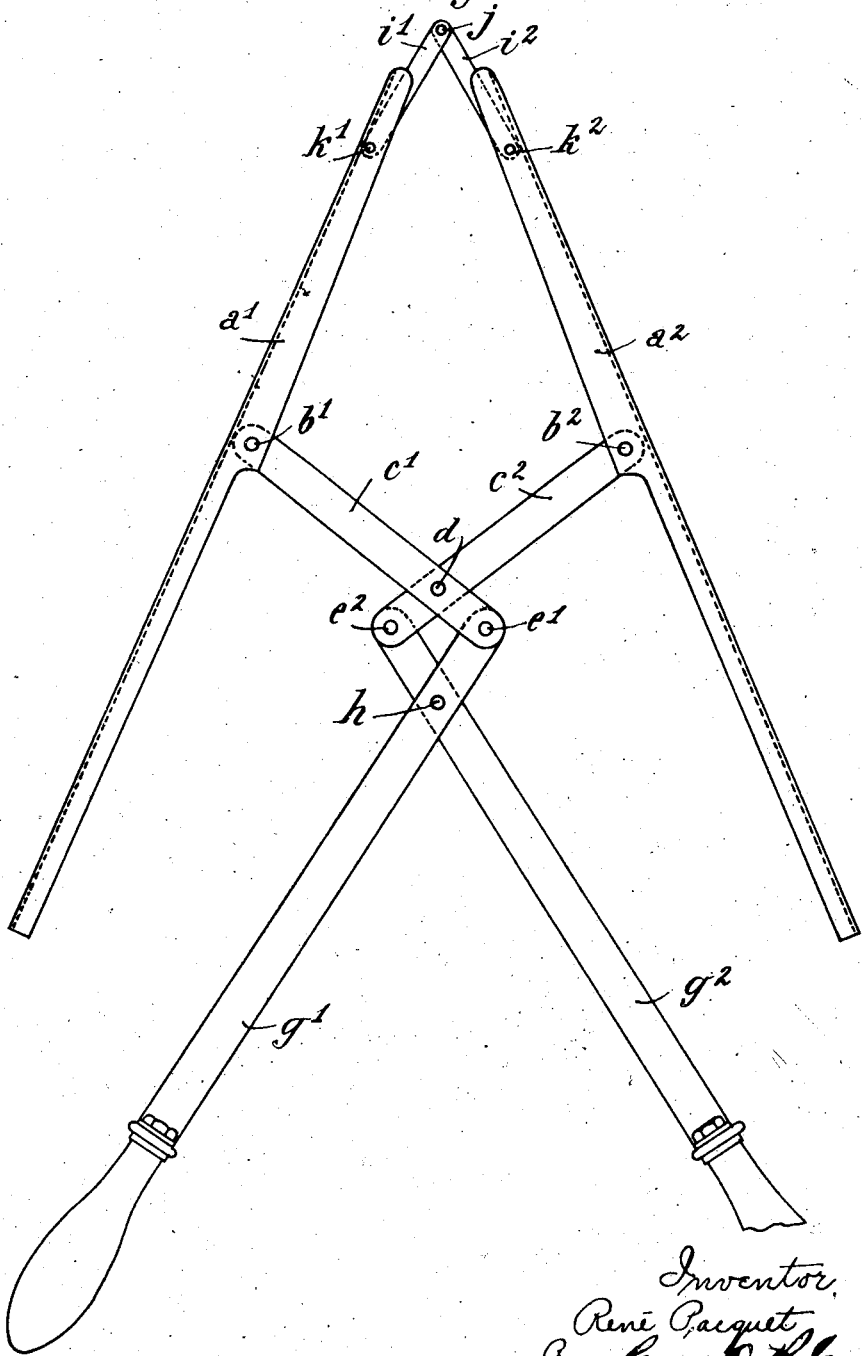

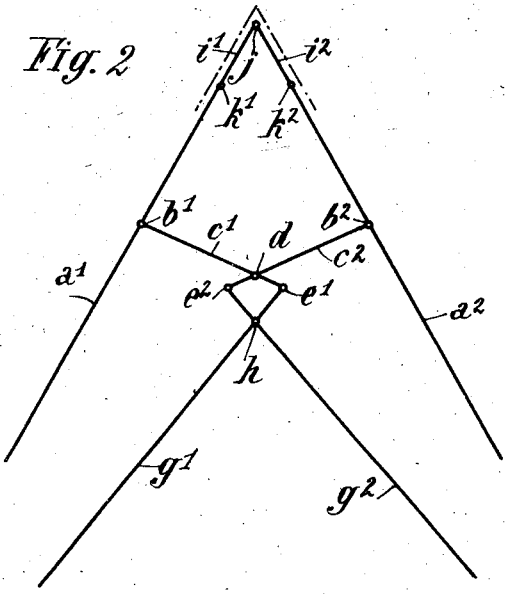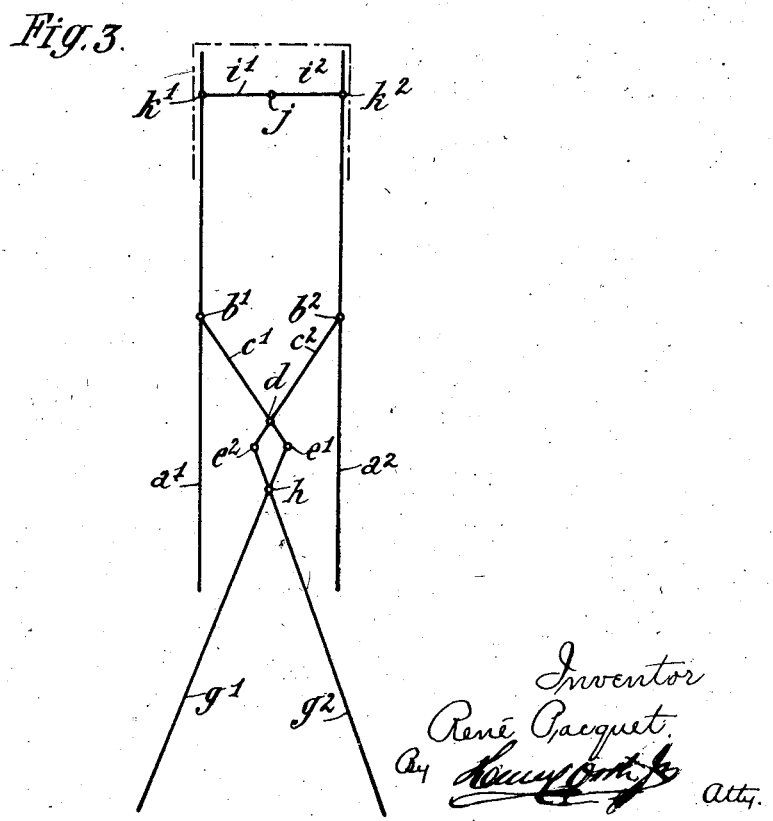

1,642,214

UNITED STATES PATENT OFFICE.

RENÉ PACQUET, OF PARIS, FRANCE.

SPREADING AND STRETCHING DEVICE FOR THE TREATMENT OF FUR SKINS.

Application filed February 27, 1925, Serial No. 12,111, and in France March 3, 1924.

At the present time, spreading and stretching devices for the treatment of fur skins consist as a rule of simple flat wood pieces of triangular shape which are inserted by force into the fur skin, so that it becomes necessary to provide various sizes of such flat pieces according to the shape of the animal. It is also a difficult matter to withdraw such pieces from the skin.

The present invention has for its object a spreading or stretching device for the treatment of fur skins which obviate this inconvenience and which may be adapted to all such skins irrespectively of their configuration. The said device consists of an arrangement of two pivoted rods which may be spread out by means of handles, whereby the said rods may open according to the sides of an angle or may be spread out in an almost parallel position.

The following description with reference to the appended drawings which are given by way of example shows the manner in which the said invention may be carried into effect.

Fig. 1 shows the spreading device, the object of the invention.

Figs. 2 and 3 are two diagrammatic views showing the operation of the said spreading device.

To the rods $a^1$ $a^2$ are pivoted near their middle part at $b^1$ $b^2$ the two links $c^1$ $c^2$ which are pivoted together at $d$ and to whose outer ends are pivoted the two handles $g^1$ $g^2$, these latter being pivoted together, at $h$. The upper parts of the rods $a^1$ $a^2$ are connected together by the links $i^1$ $i^2$ which are pivoted together at $j$ and are pivoted at $k^1$ $k^2$ to the rods $a^1$ $a^2$.

The stretching device is inserted into the skin of the animal and the handles $g^1$ $g^2$ are then separated. If the skin has a triangular shape when spread out, the ends of the said rods will meet with a great resistance, the links $i^1$ $i^2$ remaining together as shown in Fig. 2, and the rods $a^1$ $a^2$ being spread out according to the sides of an angle and thus assuming the position shown in Fig. 2, for example. On the contrary, for skins which have a rectangular form when spread out, the ends $a^1$ $a^2$ will meet with no resistance and the jointed system will spread out as shown in Fig. 3, or substantially according to a rectangle.

A catch device may be provided in order to hold the said rods in the spread out position within the skin, and this device may consist of a hook connecting both handles.

It will be noted that the stretching apparatus may be removed with facility due to the jointed arrangement which connects the two rods and which allows the spreading device to yield in spite of the pressure exercised thereon by the skin of the animal.

Obviously, the said invention may be modified in detail without departing from its principle.

What I claim is:

1. A spreading and stretching device for fur skins, comprising two rods, links pivoted at one end to the said rods and also pivoted together at a point adjacent the other ends thereof, handles pivoted to the ends of the said links and also pivoted together at a point adjacent their ends in such manner as to constitute a symmetrical jointed arrangement.

2. A spreading and stretching device for fur skins, comprising two rods, links pivoted at one end to approximately the middle of the said rods and also pivoted together at a point adjacent the other ends thereof, handles pivoted to the ends of the said links and pivoted together at a point adjacent their ends in such manner as to constitute a symmetrical arrangement.

In testimony that I claim the foregoing as my invention, I have signed my name hereto.

RENÉ PACQUET.